United States Patent [19]

Bolin

[11] Patent Number: 5,330,551
[45] Date of Patent: Jul. 19, 1994

[54] GLASSWARE FORMING MACHINE WITH COOLING SYSTEM

[75] Inventor: James A. Bolin, Tulsa, Okla.

[73] Assignee: I.M.T.E.C. Enterprises, Inc., Tulsa, Okla.

[21] Appl. No.: 984,882

[22] Filed: Dec. 2, 1992

[51] Int. Cl.⁵ .................. C03B 11/12; C03B 9/38; C03B 9/14; C03B 9/193
[52] U.S. Cl. ...................... 65/265; 65/267; 65/356; 65/360
[58] Field of Search .............. 65/356, 355, 265, 267, 65/319, 360, 359

[56] References Cited

U.S. PATENT DOCUMENTS

| | | | |
|---|---|---|---|
| 2,751,715 | 6/1956 | Denman . | |
| 3,094,404 | 6/1963 | Lauck | 65/319 |
| 3,586,491 | 6/1971 | Mennitt | 65/265 |
| 3,617,232 | 11/1971 | Goodwin | 65/267 |
| 3,653,870 | 4/1972 | Foster et al. | 65/356 |
| 3,849,101 | 11/1974 | Wythe et al. | 65/355 |
| 4,251,253 | 2/1981 | Becker et al. | 65/267 |
| 4,361,434 | 11/1982 | Schneider | 65/265 |
| 4,388,099 | 6/1983 | Hermening et al. | 65/267 |
| 4,426,218 | 1/1984 | Cabrera-Montante | 65/241 |
| 4,512,792 | 4/1985 | Irwin et al. | 65/161 |
| 4,561,875 | 12/1985 | Foster | 65/267 |
| 4,657,573 | 4/1987 | Jones | 65/265 |
| 4,690,703 | 9/1987 | Kulig | 65/265 |
| 4,701,203 | 10/1987 | Schneider | 65/356 |
| 4,750,929 | 6/1988 | Bolin | 65/265 |
| 4,842,637 | 6/1989 | Bolin et al. | 65/265 |
| 4,853,023 | 8/1989 | Bolin | 65/323 |
| 4,909,823 | 3/1990 | Bolin | 65/265 |

FOREIGN PATENT DOCUMENTS

| | | |
|---|---|---|
| 26747/84 | 10/1984 | Australia . |
| 0425128 | 5/1991 | European Pat. Off. ............... 65/356 |

*Primary Examiner*—W. Gary Jones
*Assistant Examiner*—Steven P. Griffin
*Attorney, Agent, or Firm*—Senniger, Powers, Leavitt & Roedel

[57] ABSTRACT

A cooling system for a glassware forming machine in which air is delivered to each of two plenums for upward flow of air through vertical passages in mold members on the plenums from an air outlet in the base of the machine via a lower section of flexible corrugated metal tubing, a rigid tube having a sliding sealing fit in the upper end of the lower section, and an upper section of flexible corrugated sheet metal tubing connected to the plenum.

14 Claims, 7 Drawing Sheets

GLASSWARE FORMING MACHINE WITH COOLING SYSTEM

BRIEF SUMMARY OF THE INVENTION

This invention relates to glassware forming machines and more particularly to a cooling system for the mold members of such a machine for forming glass bottles.

The invention is especially directed to cooling systems for the mold members of glassware forming machines of the type such as shown in U.S. Pat. Nos. 3,849,101, 4,251,253, 4,361,434, 4,388,099, 4,561,875, 4,750,929, 4,842,637 and 4,909,823 wherein air is blown through passages in the mold members for cooling them.

Among the several objects of the invention may be noted the provision of an improved simplified compact system for delivering air to the mold members of a glassware forming machine for flow of air through the air passages therein allowing for their swinging toward and away from one another between their open and closed positions, providing for relatively low restriction to flow of air and relatively uniform and efficient cooling of the mold members for production of glassware (especially bottles) at relatively high speed with relatively few defects, relatively low energy consumption in blowing air, and relatively low noise levels; the provision of such a system wherein wear of parts is reduced for longer life of the system; the provision of such a system which is capable of accommodating varying sizes of mold members; and the provision of such a system wherein the mold holding assemblies may be readily changed for use of different molds.

In certain respects the invention involves an improvement over the cooling systems disclosed in U.S. Pat. Nos. 4,561,875 and 4,842,637, the latter especially being incorporated herein by reference.

In general, a glassware forming machine of this invention comprises a pair of carriers each pivoted on a generally vertical axis for swinging movement toward and away from each other between an open position and a closed position, a plurality of mold members carried by each carrier, each mold member on each carrier being related to a mold member on the other so that, with the carriers in their said closed position, each mold member on one carrier mates with a mold member on the other to define a mold cavity for molding an item of glass. Each mold member has air passages extending therethrough for passage of air for cooling. Each carrier carries a plenum for delivering air to the air passages of the mold members carried by the carrier, the plenum having ports for flow of air into the passages in the mold members and thence through and out of said passages. Chamber means is provided below said carriers for air to be blown into the plenums and thence up through said air passages. Means for delivery of air from said chamber means to each plenum allowing swinging of said carriers comprises, for each carrier, conduit means comprising flexible corrugated bellows-formation metal tubing in communication at one end constituting its lower end with said chamber for entry of air from said chamber, and in communication at its other end constituting its upper end with the plenum for delivery of air into the plenum.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
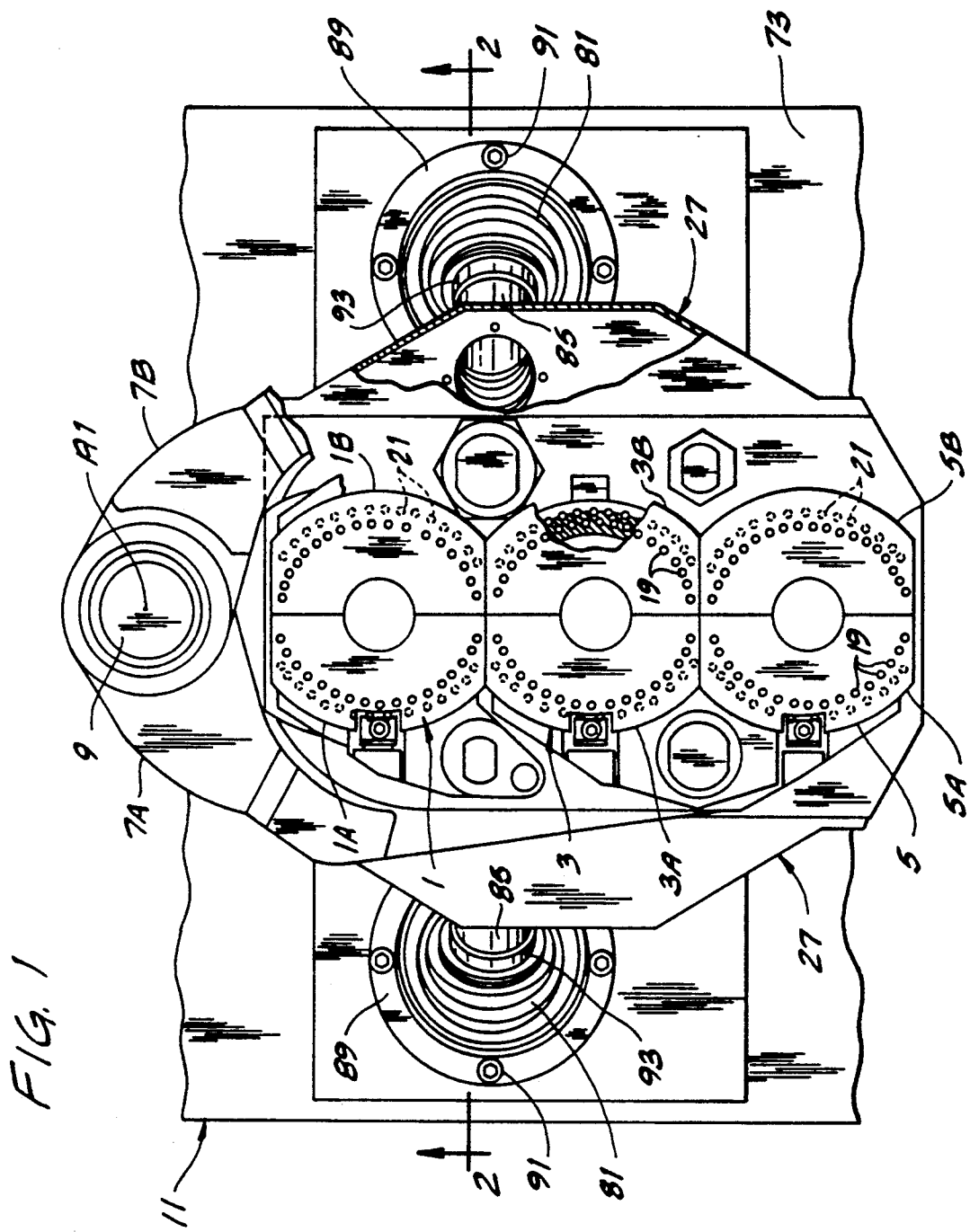
FIG. 1 is a plan, with parts broken away and shown in section, of the mold side of an individual section of a glassware forming machine in which the present invention is embodied, the mold carriers and mold members on the mold side of said section of the machine being shown in closed position.

Referring to the drawings, the invention is illustrated as it is embodied on what is called the "mold side" of an individual section of a cyclically operating glassware forming machine of the individual section type, such as referred to in the above-noted U.S. Pat. Nos. 4,561,875 and 4,842,637 for cooling the mold members in which a parison or blank, formed on the parison or blank molding side of the section, is blown to form the final product, e.g. a bottle. The invention may also be embodied in the blank molding side of a section for cooling the blank mold members on that side. As illustrated in FIG. 1, the slated section of the glassware forming machine is of the type referred Lo as a triple gob section, comprising three pairs 1, 3 and 5 of mold members for molding three bottles at a time, each member constituting a mold half, as is well known. It will be understood that the invention is applicable to glassware forming machine sections other than a triple gob section, e.g. a two-gob section. The two members of the first pair are designated 1A and 1B, the two members of the second pair are designated 3A and 3B and the two members of the third pair are designated 5A and 5B. The three mold members 1A, 3A and 5A are carried by a carrier 7A and the three mold members 1B, 3B, 5B are carried by a carrier 7B. The carriers are pivoted on a first and fixed generally vertical axis indicated at A1 for swinging movement toward and away from each other between the closed position in which they are illustrated in FIG. 1, wherein mold members 1A and 1B, 3A and 3B, 5A and 5B are closed on each other for the blow molding of a blank into a bottle in each of the closed pairs of members, and an open position, wherein the two mold members of each pair of mold members are spaced from each other for entry therebetween of blanks and for removal of completed bottles. The carriers 7A and 7B are pivoted on a vertical shaft 9 which extends up from the top of a base 11 of the stated individual section of the glassware forming machine. Suitable mechanism well-known in the art is provided for cyclically swinging the carriers between their open and closed positions for the bottle molding process.

Each mold member 1A, 1B, 3A, 3B, 5A and 5B constitutes a mold half, having a cavity 13 therein which is shaped in accordance with the shape of a bottle to be formed so that, with the two mold halves brought together in closed position, the cavities of the two halves define the shape of the wall and part of the neck of the bottle. At the bottom, the two mold halves of each pair close on a mold bottom member 15 as well known in the art. The bottom of the bottle is formed against the mold bottom member 15, and the bottle is supported on the latter when the mold halves open. Each mold half has a generally arcuate peripheral wall 17 having air passages such as indicated at 19 and 21 extending upwardly from the bottom thereof, each of these passages opening into the ambient atmosphere at its upper end for passage of air through the passages for cooling the mold half, the air exiting into the ambient atmosphere from the upper ends of the passages. Passages 19 constitute an inner group of passages extending from bottom to top of the mold half on part of an inner circle. Passages 21 constitute an outer group of passages in an enlarged-diameter lower part 23 of the mold half on part of an outer circle, these passages opening into the ambient atmosphere at the top of said lower part 23 (see FIG. 2).

Means designated 25 in its entirety is provided for blowing air through the air passages 19 and 21 in both the open and closed positions of the mold halves. Blowing means 25 comprises a plenum 27 carried by each of the carriers 7A and 7B. The mold halves 1A etc. carried on each carrier extend up from the plenum on that carrier, and the plenum has ports 29 (see FIG. 2) at the top thereof for flow of air up into the passages 19 and 21 in the mold halves on the plenum and thence up through and out of the passages. Each plenum has an inner section 31 and a relatively deep outer section 33, these sections having a common flat top wall 35, this wall and other walls of the plenum defining a plenum chamber 47. At the inside, the plenum is of scalloped formation having three scallops such as indicated at 49 in U.S. Pat. No. 4,842,637, one for each of the three respective mold halves carried on the plenum. Each mold half has a reduced-diameter lower end portion 51 which fits in a respective scallop as in U.S. Pat. No. 4,842,637. At the upper end of the reduced diameter lower end portion, each mold half has an outwardly extending downwardly facing flat horizontal shoulder portion 53 which seats on the top wall of the respective plenum around the respective scallop. The passages 19 and 21 extend upward from this shoulder, and each of the ports 29 is constituted by an arcuate slot in the top wall 35 of the plenum adjacent the respective scallop as in U.S. Pat. No. 4,842,637. Each mold half is removably associated in suitable manner with the respective plenum with the lower ends of the passages 19 and 21 of the mold half in register with a respective arcuate slot.

The carriers 7A and 7B may be made as shown in U.S. Pat. No. 4,853,023 which is incorporated herein by reference, with upper and lower extensions 55 and 57 corresponding to those indicated at 11 and 13 in U.S. Pat. No. 4,853,023 and upper and lower mold holding assemblies such as indicated at 21 and 23 in U.S. Pat. No. 4,853,023 and here designated 59 and 61. Each of the plenums 27 is mounted on the bottom of the respective lower mold holding assembly 61, with a shim 65 therebetween.

As previously described, the shaft 9 on which the carriers or arms 7A, 7B are pivoted extends up from the base 11 of the stated section of the glassware forming machine. This base is formed to provide and thereby constitute means providing a chamber 67 for air to be blown into the plenums and thence up through the passages 19 and 21 in the mold halves 1A etc. both when they are in their closed position and when they are in their open position. The base with the chamber 67 therein is sometimes referred to as the "wind box" of the machine. The chamber is supplied with air by a blower (not shown) in a manner well known in the art.

Thus far, the glassware forming machine is substantially the same as that disclosed in U.S. Pat. No. 4,842,637. Conduit means of this invention indicated generally at 69 is provided for delivery of air from the chamber 67 to each plenum 27, this means being such as to allow swinging of the carriers 7A, 7B. The air delivery means 69 for the left-hand plenum and the air delivery means 69 for the right-hand plenum are identical except for being of opposite hand, and a description of one will suffice for both. Each comprises an opening or outlet 71 in a top plate 73 of the chamber or wind box 67, and an opening 75 at the bottom of the outer section 33 of the respective plenum, Each conduit means 69 comprises flexible corrugated bellows-formation metal tubing in communication at one end constituting its lower end with chamber 67 (via outlet 71) for entry of air from chamber 67 and in communication at its other end constituting its upper end with the plenum 27 (via opening 75) for delivery of air into the plenum.

More particularly, the conduit means 69 comprises a lower section 81 of flexible corrugated bellows-formation metal tubing in communication at one end constituting its lower end with the chamber 67 (via outlet 71), an upper section 83 of flexible corrugated bellows-formation metal tubing in communication at one end constituting its upper end with the plenum 27 (via opening 75), and a rigid metal tube 85 of hollow cylindrical cross section extending between the upper end of the lower section 81 and the lower end of the upper section 83.

The lower section 81, when unflexed, is generally of tapered, frusto-conical shape, flaring outwardly away from the upper section 83, its large-diameter end 87 being its lower end, and being secured as by welding to a ring 89 attached as by screws 91 to the top of the base 11 in register with the outlet 71 in the top of the base. A rigid sleeve 93 is secured as indicated at 95 to the upper (smaller) end of section 81 coaxial with the latter. The upper section 83 is rigidly connected at its upper end to a tubular cylindric fitting 97 secured as indicated at 99 to the bottom of the plenum 27 registering with the opening 75 in the bottom of the plenum. The upper section 83 as shown is of cylindric form, its diameter corresponding to that of the rigid tube, and the latter is secured at one end constituting its upper end to the circular lower end of the section 83 as by welding with file rigid tube generally coaxial with the flexible tubing section 83 when the latter is unflexed.

The outside diameter of the rigid tube 85 and the inside diameter of the sleeve 93 are such as to provide for a sliding sealing fit of the rigid tube in the sleeve and to provide clearance therein for the rigid tube 85 when the section 81 is deflected, the rigid tube being of such length as to extend through the sleeve in all positions of the plenum in its swing around the axis A1. The rigid tube 85 is slidable completely out of the sleeve 93. The lower section 81, file rigid tube 85 and the upper section 83 are made of a metal which is resistant to high temperature, such as a nickel-chromium alloy sold under the trademark INCONEL by International Nickel Co., or electro deposited nickel or nickel with a cobalt alloy also sold under this mark. The flexible tubing may be purchased from Servo Meter, Inc. of Cedar Grove, N.J.

At 103 is indicated an air cylinder which extends vertically in chamber 67 and is secured to the bottom of the plate 73 as indicated at 105. The piston rod (not shown) of this cylinder extends up and out of the upper end of the cylinder and carries a valve member 109 for controlling flow of air from chamber 67 into the lower end of the conduit means 69.

Figure 2:
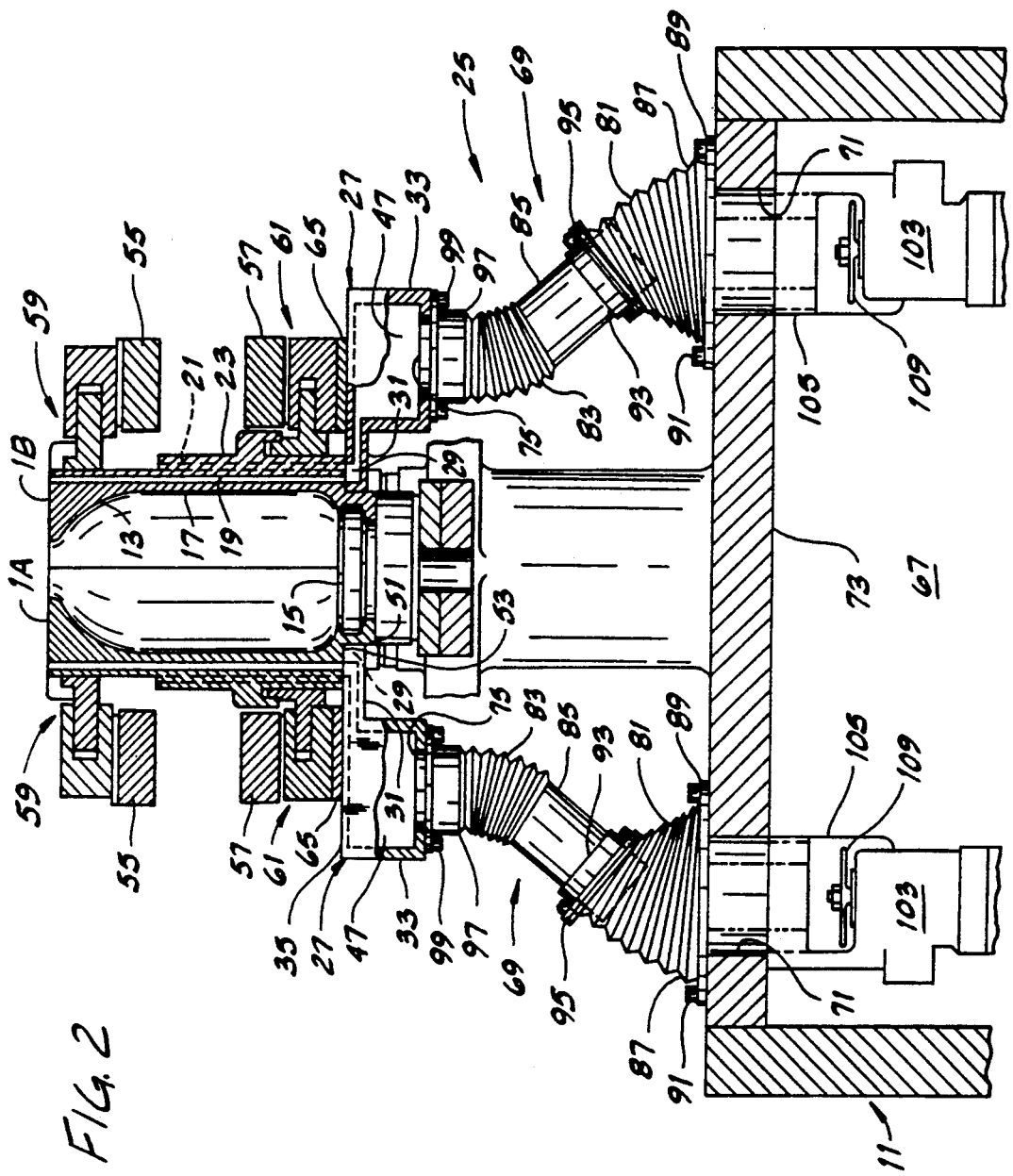
FIG. 2 is a vertical section generally on line 2—2 of FIG. 1.
Figure 3:
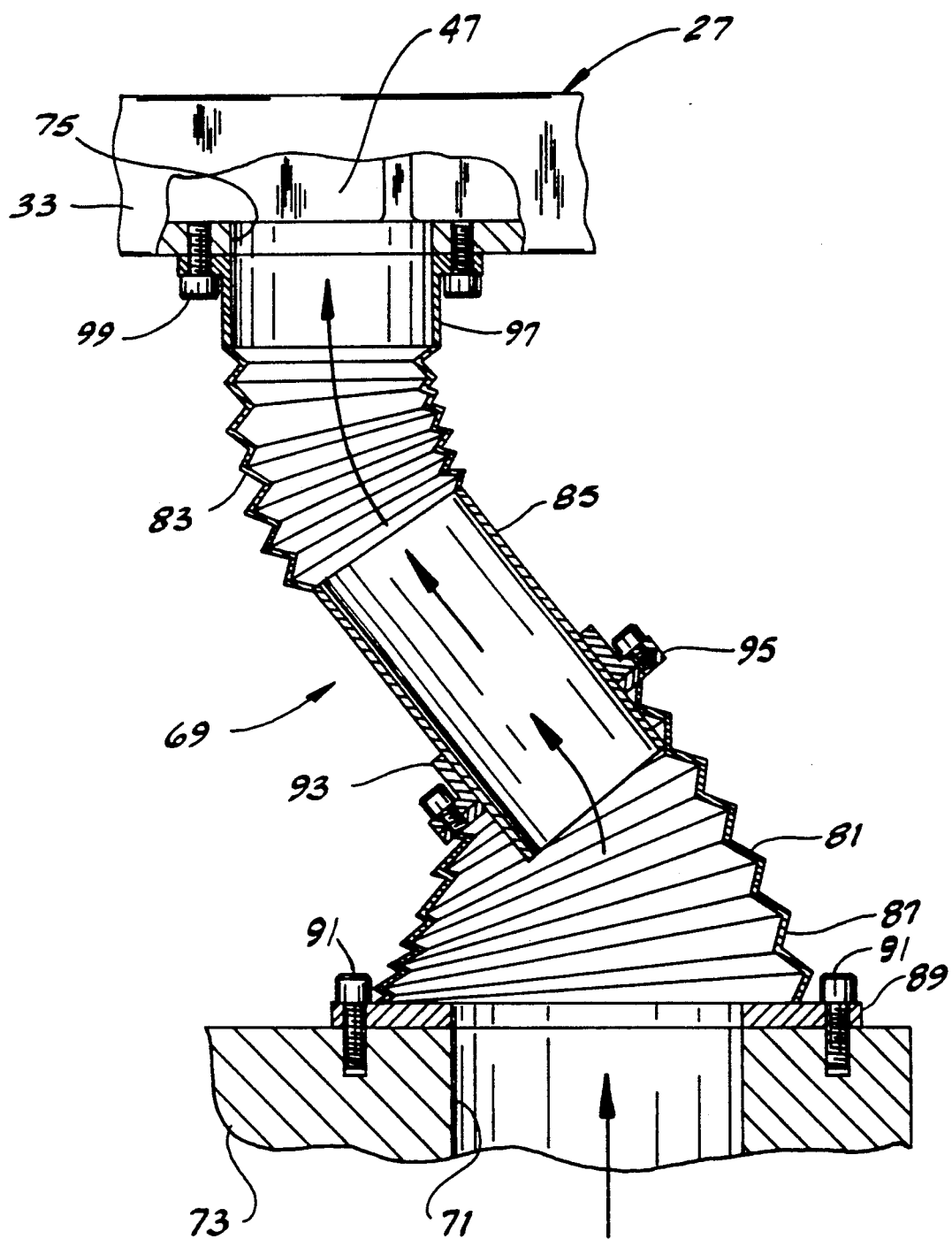
FIG. 3 is an enlarged fragment of FIG. 2.
Figure 4:
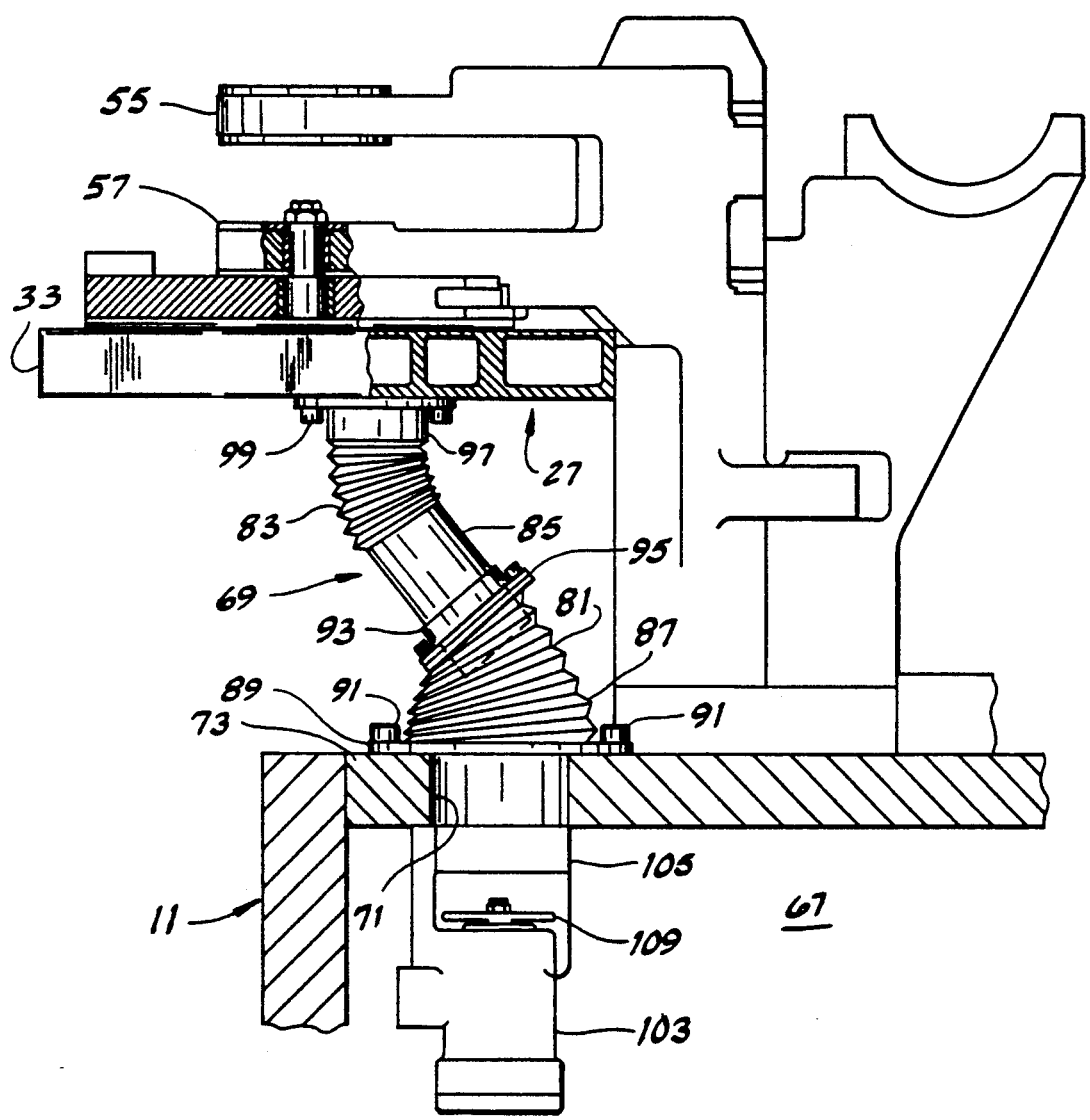
FIG. 4 is a side view, with parts broken away and shown in section.

With the lower flexible tubing section 81 and the upper flexible tubing section 83 capable of universal flexing movement, and with the rigid tube 85 having the sliding sealing fit in the sleeve 93, the mold carriers 7A and 7B (carrying the plenums 27 and the mold halves 1A, etc.) are allowed to swing between their open and closed positions (the closed position being shown in FIGS. 1 and 2). As the plenums swing open and closed, the inclination of the axis of the rigid tube changes, as permitted by the flexing of the sections 81 and 83, and the rigid tube 85 slides in and out of the sleeve 93 at the upper end of the lower section 81 to accommodate the change in the distance between the upper end of the lower section 81 and the lower end of the upper section 83. With valve member 109 open, air flows from chamber 67 through the lower flexible tubing section 81, through the rigid tube 85 and the upper flexible tubing section 83 into the plenum 27 and thence upward through the air passages 19 and 21 in the mold halves for cooling the latter. The flow is relatively direct as may be observed from FIG. 3.

The arrangement with the rigid tube 85 slidable in the sleeve 93 and slidable completely out of the sleeve enables the mold holding assemblies 61 to be readily changed (for use of different molds). The flexibility of the lower and upper sections 81 and 83 enables the rigid tube 85 readily to be pulled out of the sleeve 93 on removal of the mold holding assembly, and enables ready insertion of the rigid tube of another mold holding assembly in the sleeve.

Figure 5:
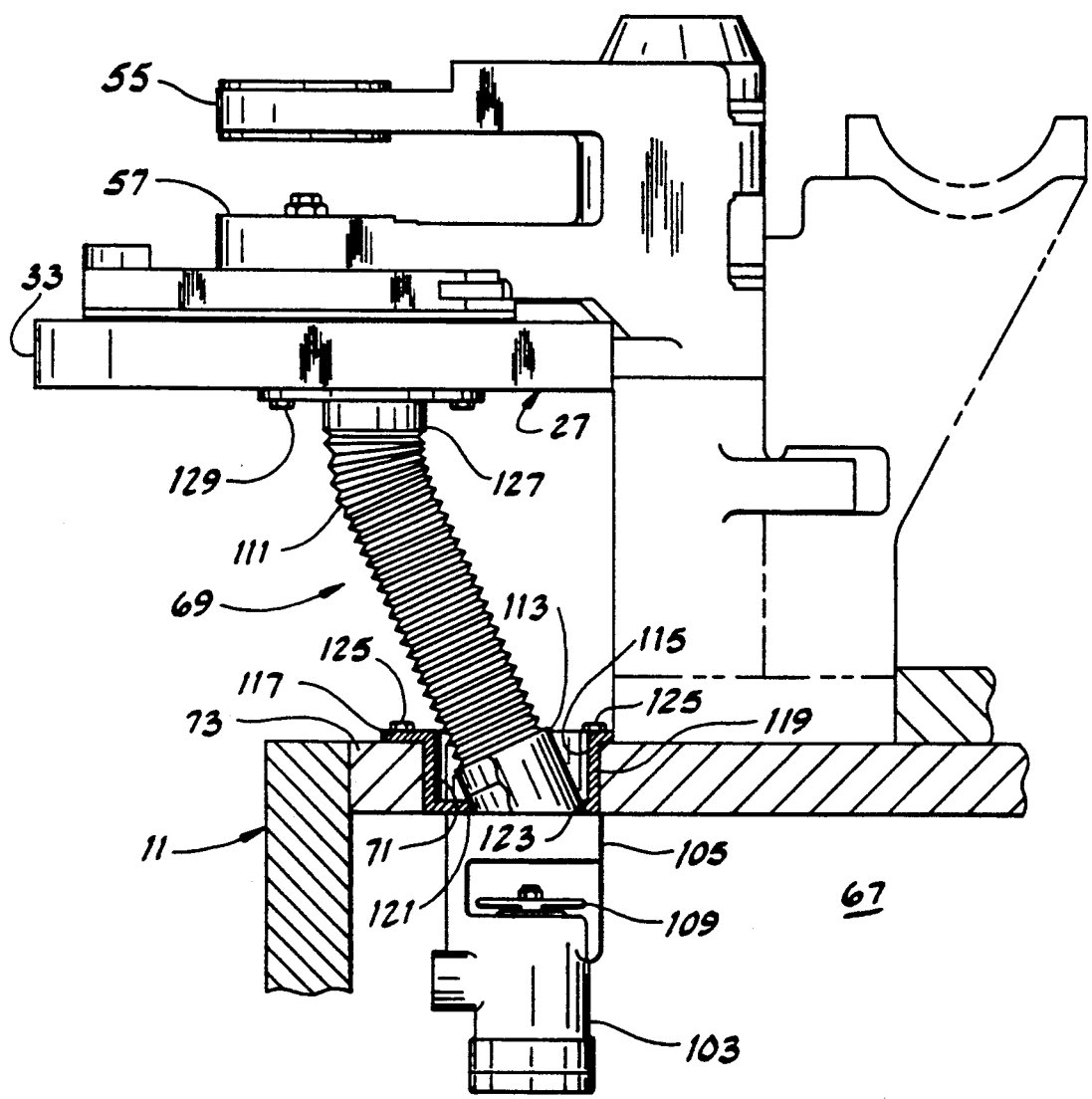
FIG. 5 is a view similar to FIG. 4 showing a cooling system of a second embodiment.

FIG. 5 shows another embodiment wherein the conduit means 69 comprises a length of flexible corrugated bellows-formation metal tubing 111 attached at its lower end to a fitting 113 by welding. Mounted in outlet 71 is a cup 115 having a recessed portion extending towards chamber 67. More particularly, the cup 115 comprises a flange 117 which is retained on the top surface of the top plate 73, a side wall 119 extending down from the flange within outlet 71 and a bottom 121 laving an opening 123 formed therein for communication between the tubing 111 and the chamber 67. Fitting 113 is attached to cup 115 by welding and extends upwardly from bottom 121 at an angle generally in the direction of the opening 75 in the bottom of the plenum 27. The cup 115 provides additional vertical space to accommodate mold members for larger bottles. The cup 115 is secured to the top plate 73 by screws 125 at flange 117 of the cup. Tubing 111 is welded at its upper end to a fitting 127 which is attached by screws 129 to the bottom of the plenum 27 in registry with the opening 75 in the bottom of the plenum.

Figure 6:
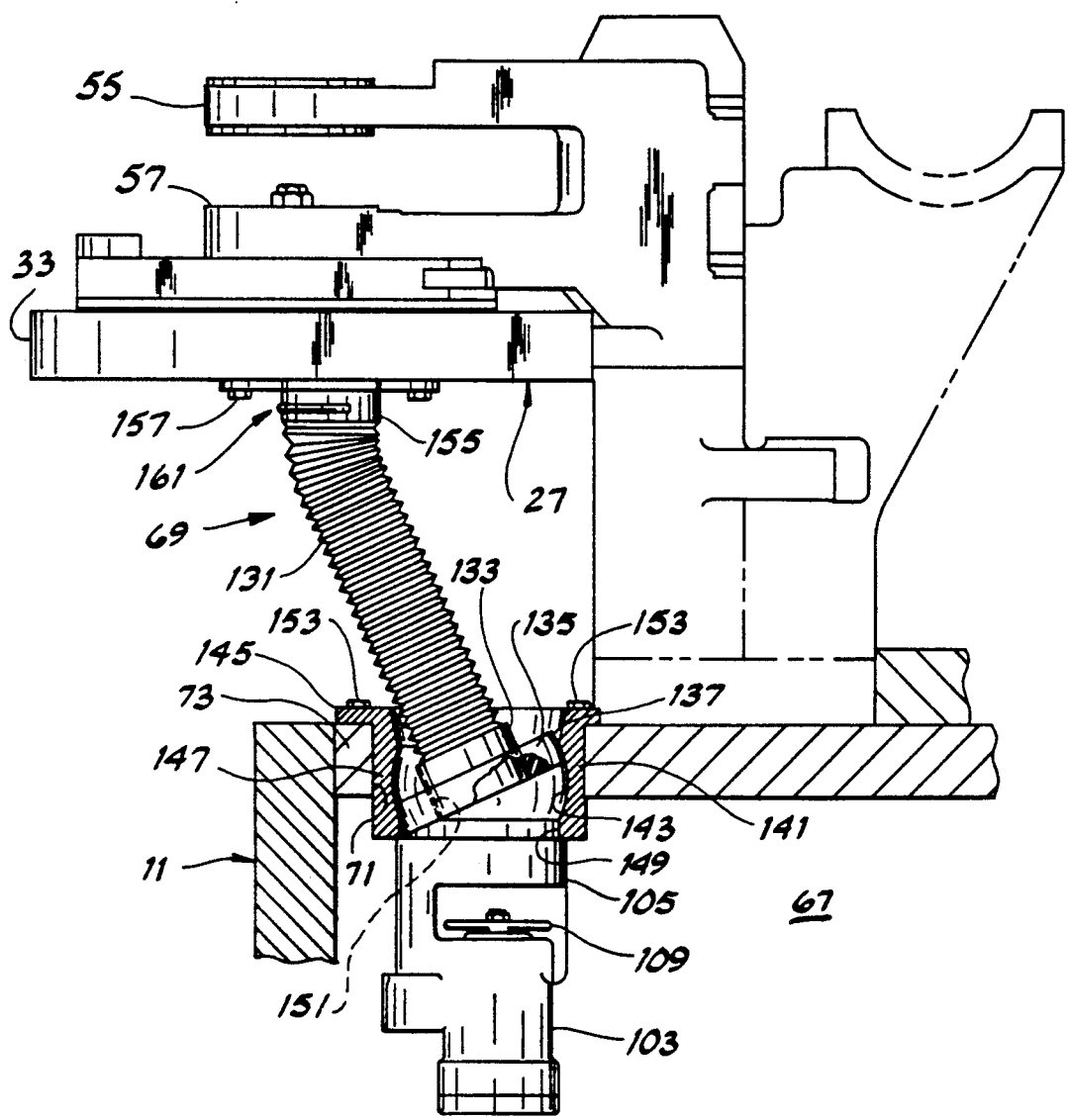
FIG. 6 is a view similar to FIGS. 4 and 5 showing a cooling system of a third embodiment.

Referring to FIG. 6, there is shown yet another preferred embodiment, with conduit means 69 comprising a length of flexible corrugated bellows-formation metal tubing 131, similar to the embodiment shown in FIG. 5, except that its lower end is attached to a fitting 133 having a knuckle 135 for added universal movement of the lower end of the tube. More particularly, the knuckle 135 has a part-spherical outer or external surface 137 for universal movement within an annular bearing member formed in a cup 141 comprising a part-spherical internal surface 143. Like cup 115, cup 141 comprises a flange 145 which is retained on the top surface of the top plate 73 and a side wall 147 extending down from the flange within outlet 71 and terminating in an opening 149. The arrangement is such that a substantially air-tight seal between the part-spherical external surface 137 of the knuckle 135 and the part-spherical internal surface 143 of the cup 141 is maintained. The knuckle 135 has a diametrical opening or bore 151 extending from the bottom to the top thereof for communication between the tubing 131 and the chamber 67. Like the embodiment shown in FIG. 5, the cup 141 is secured to the top plate 73 by screws 153. The upper end of the tubing 131 is welded to a fitting 155 which is attached by screws 157 to the bottom of the plenum 27 in registry with the opening 75 in the bottom of the plenum. In addition to the cup 141 providing more vertical space to accommodate mold members for larger bottles, the tubing 111 is more adapted to freely move about as the mold carriers 7A and 7B swing between their open and closed positions because of the added universal movement provided by the knuckle and annular bearing member.

Figure 7:
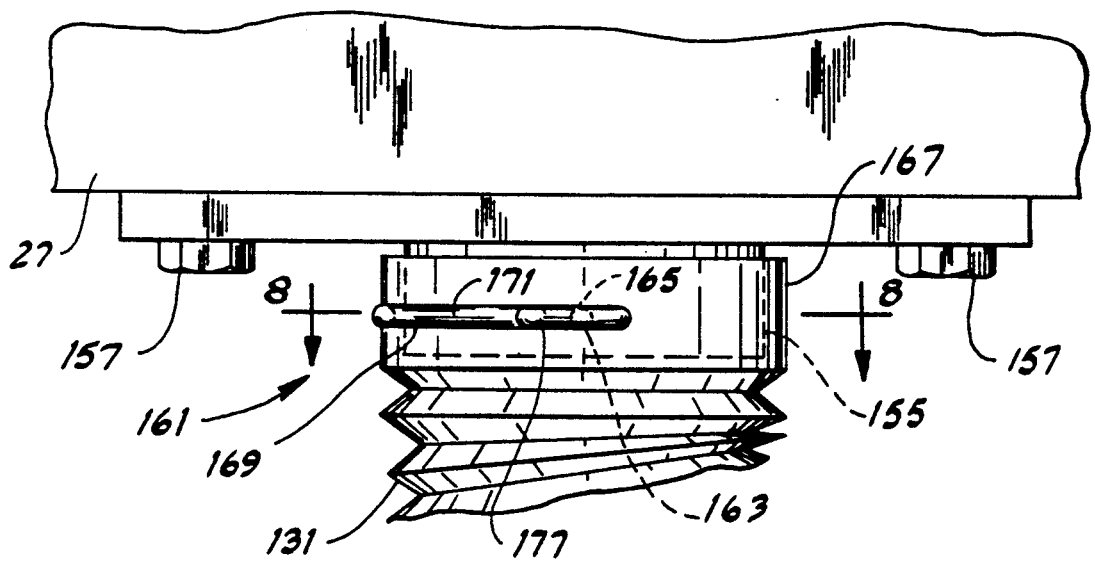
FIG. 7 is an enlarged fragment of FIG. 6.
Figure 8:
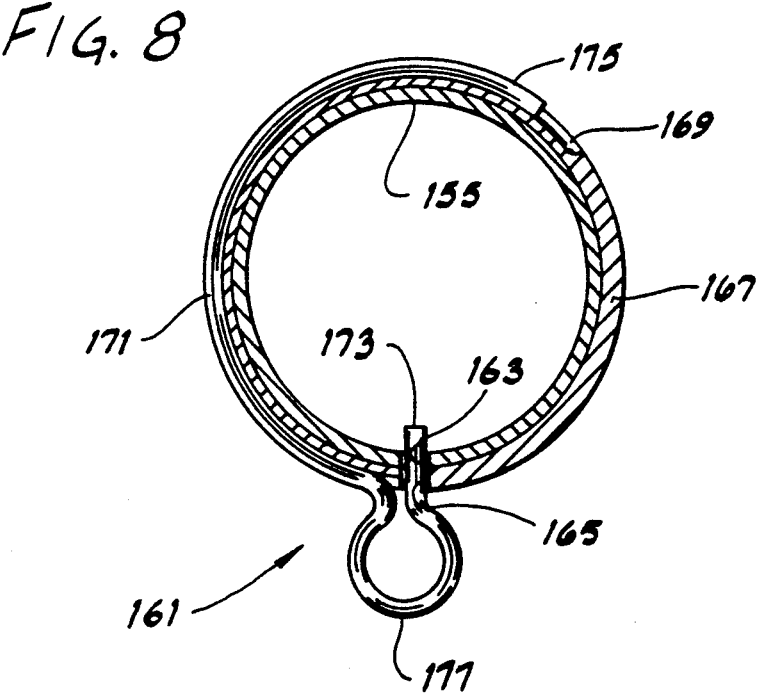
FIG. 8 is a horizontal section taken along line 8—8 of FIG. 7.

Turning now to FIGS. 7 and 8, there is generally indicated at 161 means for releasably latching the upper end of the flexible corrugated bellows-formation metal tubing (e.g., tubing 131) to the bottom of the plenum 27 without having to remove the fasteners (e.g., fasteners 157) from the fittings (e.g., fitting 155). It is to be understood that each of the embodiments disclosed herein may incorporate means 161 for releasably latching the tubing to the bottom of the plenum. In the embodiments shown in FIGS. 1-5, the fasteners are removed from the fitting by unscrewing the fasteners which can be a tedious task due to the limited space available. Means 161 is provided for avoiding having to unscrew the fasteners from the fitting by including a small opening 163 formed in the fitting 155 and a corresponding opening 165 (i.e., having the same diameter as opening 163) formed in a collar 167 connected to the upper end of the flexible corrugated bellows-formation metal tubing 131. Collar 167 slidingly fits over the fitting 155 for making a relatively air-tight connection in which openings 163 and 165 overlap so that they are in registry to create a single opening. A groove 169 having one end terminating in opening 165 is formed in the outer surface (i.e., around the outer circumference) of the collar 167 in a direction transverse to the general direction of the tubing 131. A spring clip 171 snaps into and sits within the groove 169 and includes an end 173 which enters into the registered openings 163 and 165 radially inwardly with respect to the collar 167 and fitting 155 to prevent the relative movement of the collar with the fitting. Clip 171 snaps into the groove 169 by engaging the ends of the clip (i.e., end 173 and end 175) with the collar so that they are spread apart upon engaging the outer surface of the collar 167 (along the groove) and move back towards one another upon clearing the widest point of the outer diameter of the collar. The clip 171 is formed to remain within the groove 169 upon being snapped therein so that the end 173 remains in the openings 163 and 165. The end 173 of the clip 171 retains the collar 167 to the fitting 155 thereby preventing the collar from sliding off the fitting. A looped portion 177 of the clip 171 allows the removal of the end 173 of the clip from the openings 163, 165 by applying a radially outwardly directed force on the loop of the clip. Thus, once the end 173 of the clip 171 is removed from the opening 163 of the fitting 155, the collar 167 may slip off the fitting to release the tubing 131 from the plenum 27.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A glassware forming machine comprising:
   a pair of carriers each pivoted for swinging movement toward and away from each other between an open position and a closed position;
   a plurality of mold members carried by each carrier, each mold member on each carrier being related to a mold member on the other carrier so that, with the carriers in their said closed position, each mold member on one carrier mates with a mold member on the other carrier to define a mold cavity for molding an item of glass,
   each mold member having air passages extending therethrough for passage of air for cooling;
   a plenum carried by each carrier for delivering air to the air passages of the mold members carried by the carrier, the plenum having ports for flow of air into the passages in the mold members and thence through and out of said passages;
   means providing a chamber below said carriers for air to be blown into the plenums and thence up through said air passages, and
   means for delivery of air from said chamber means to each plenum allowing swinging of said carriers and comprising, for each carrier:
   conduit means comprising flexible corrugated bellows-formation metal tubing in communication at one end constituting its lower end with said chamber for entry of air from said chamber, and in communication at its other end constituting its upper end with the plenum for delivery of air into the plenum.

2. A glassware forming machine as set forth in claim 1 wherein said conduit means comprises a lower section of flexible corrugated bellows-formation metal tubing in communication at one end constituting its lower end with said chamber, an upper section of flexible corrugated bellows-formation metal tubing in communication at one end constituting its upper end with the plenum, and a rigid metal tube extending between the upper end of the lower flexible section and the lower end of the upper flexible section, said rigid tube being connected at one end to one of said flexible sections and having a sliding sealing fit in the other flexible section, the rigid tube being slidable completely out of said other flexible section.

3. A glassware forming machine as set forth in claim 2 wherein the flexible section having the sliding sealing fit with the rigid tube has a rigid sleeve secured thereto in which the rigid tube is slidable.

4. A glassware forming machine as set forth in claim 2 wherein the flexible tubing section having the sliding sealing fit with the rigid tube is shaped to provide clearance therein for the rigid tube when the section is deflected.

5. A glassware forming machine as set forth in claim 4 wherein the flexible section having the sliding sealing fit with the rigid tube is of tapered conformation, flaring outwardly away from said rigid tube.

6. A glassware forming machine as set forth in claim 2 wherein the upper flexible tubing section has a lower end and the lower flexible tubing section has an upper end, and wherein the rigid tube is secured at one end of the rigid tube constituting its upper end to the lower end of the upper flexible tubing section, said rigid tube extending down from the upper flexible tubing section, and said rigid tube has the sliding sealing fit in the upper end of the lower flexible tubing section.

7. A glassware forming machine as set forth in claim 6 wherein the lower flexible tubing section has a rigid sleeve secured thereto at its upper end and extending upward therefrom, the rigid tube being slidable in the sleeve.

8. A glassware forming machine as set forth in claim 7 wherein the lower flexible tubing section is shaped to provide clearance therein for the rigid tube when the section is deflected.

9. A glassware forming machine as set forth in claim 8 wherein the lower flexible tubing section is of tapered conformation, flaring outwardly away from said upper end of said flexible tubing section and outwardly away from the rigid tube.

10. A glassware forming machine as set forth in claim 1 wherein said chamber means comprises a cup having a bottom, and wherein the lower end of the flexible corrugated metal tubing is attached to a fitting extending upwardly from the bottom of the cup, the cup further having a recessed portion and an opening formed in the bottom thereof for communication between the tubing and said chamber means, the fitting extending at an angle generally in a direction towards the plenum.

11. A glassware forming machine as set forth in claim 1 wherein the lower end of the flexible corrugated metal tubing has a part-spherical knuckle mounted thereon for universal movement within a part-spherical annular bearing member formed at a top of the chamber, the knuckle having a diametrical opening therein for communication between the tubing and said chamber means.

12. A glassware forming machine as set forth in claim 11 wherein a cup is mounted on said chamber means, said cup having the part-spherical annular bearing member formed therein.

13. A glassware forming machine as set forth in claim 1 further comprising means for releasably latching the flexible tubing at its upper end to the plenum with a relatively air-tight connection between the upper end of the tubing and the plenum.

14. A glassware forming machine as set forth in claim 13 wherein the plenum has a bottom fitting having an opening, said upper end of the flexible tubing being fitted with a collar adapted for connecting the tubing to the bottom fitting of the plenum, said collar having a groove formed therein on its outer surface and an opening extending therethrough, said latching means comprising a clip positioned in the groove, the clip having an end extending radially inwardly with respect to the collar, the end of the clip being adapted to enter into the openings provided in the collar and the bottom fitting of the plenum such that the end of the clip positively latches the bottom fitting of the plenum to said collar and upon removal of the end of the clip from the openings, the collar will be released from the bottom fitting of the plenum.

* * * * *